(12) United States Patent
Matsuhisa et al.

(10) Patent No.: US 8,017,266 B2
(45) Date of Patent: Sep. 13, 2011

(54) BATTERY HAVING POSITIVE TEMPERATURE COEFFICIENT ELEMENT

(75) Inventors: Ichiro Matsuhisa, Hyogo (JP); Susumu Kato, Osaka (JP); Yasushi Sumihiro, Hyogo (JP)

(73) Assignee: Panasonic Corporation, Osaka (JP)

( * ) Notice: Subject to any disclaimer, the term of this patent is extended or adjusted under 35 U.S.C. 154(b) by 1047 days.

(21) Appl. No.: 11/896,473

(22) Filed: Aug. 31, 2007

(65) Prior Publication Data
US 2008/0102367 A1 May 1, 2008

Related U.S. Application Data

(60) Provisional application No. 60/846,757, filed on Sep. 25, 2006.

(51) Int. Cl.
*H01M 2/08* (2006.01)
(52) U.S. Cl. ............... 429/174; 429/62; 429/173
(58) Field of Classification Search .............. 429/174
See application file for complete search history.

(56) References Cited

U.S. PATENT DOCUMENTS

| 2002/0081483 A1* | 6/2002 | Nemoto et al. ............. 429/53 |
| 2005/0026033 A1* | 2/2005 | Kawano et al. ............. 429/53 |
| 2006/0046154 A1 | 3/2006 | Webber et al. |

* cited by examiner

*Primary Examiner* — Ula C. Ruddock
*Assistant Examiner* — Patricia Davis
(74) *Attorney, Agent, or Firm* — McDermott Will & Emery LLP

(57) ABSTRACT

A highly reliable cylindrical primary battery is provided where the surface temperature of a body portion of which at the time of a short circuit is controlled to be low. The heat conductivity $\lambda$ (W/m·K) of a resin sealing body of a sealing assembly having a PTC element and the amount of heat generation $Q$ (W) in the PTC element at the time of tripping are set so that the relational expressions of:

$$0.12 \leq \lambda \leq 0.27; \quad (1)$$

$$1.0 \leq Q \leq 1.5; \text{ and} \quad (2)$$

$$Q \leq -3.33\lambda + 1.9 \text{ are met.} \quad (3)$$

8 Claims, 2 Drawing Sheets

BATTERY HAVING POSITIVE TEMPERATURE COEFFICIENT ELEMENT

CLAIM OF PRIORITY

This application claims the benefit of U.S. Provisional Application No. 60/846,757, filed on Sept. 25, 2006, the disclosures of which are incorporated herein by reference.

FIELD OF THE INVENTION

The present invention relates to an electrochemical device such as a battery comprising a positive temperature coefficient (PTC) element.

BACKGROUND OF THE INVENTION

Various considerations have been made on a battery comprising a PTC element preventing heat generation in the battery resulting from an excess current at the time of a short circuit for the purpose of improving the safety of the battery. For example, the surface of a negative electrode current collector is coated with an electronic conductor containing mainly polyethylene and having a PTC function, but the electronic conductor coated on the surface of the negative electrode current collector tends to be decomposed by an alkaline electrolyte, and there may be cases where the PTC function is not sufficiently exhibited.

Further, in another example, a sealing body comprising a PTC element is used in an alkaline battery or a lithium battery. The PTC element has a (trip) function of abruptly increasing a resistance when the element itself generates heat to reach a predetermined temperature in case that an overcurrent flows, and if the battery is erroneously short-circuited, the PTC element trips to block the overcurrent, thus making it possible to inhibit abnormal heat generation of the battery.

However, the above described configuration may have some problems. That is, when a large current is almost continuously consumed in a normal use state such as continuous light emission in a stroboscope or continuous photographing in a digital still camera, a PTC element may act as a resistor and may gradually generate heat to unintentionally actuate the PTC element.

It is desirable to actuate the PTC element at the lowest possible temperature at the time of a short circuit, but it is difficult to have a good balance between the heat generation temperature and the actuation temperature of the PTC element in terms of design of a battery. Therefore, there were many cases where heat generation in the battery resulting from an overcurrent at the time of a short circuit was not sufficiently inhibited so that a user feels that a body portion of the battery is hot.

There were cases where heat generation in the PTC element itself when tripped by an overcurrent at the time of a short circuit thermally damaged a resin sealing body covering the PTC element, and the resin sealing body was thermally deformed or carbonized at a high temperature to deteriorate the sealing characteristic of the battery, thus causing liquid leakage.

Thus, one aspect of the invention solves the problems of conventional techniques described above, and provides a highly reliable battery of which the surface temperature of a body portion of a battery at the time of a short circuit is controlled to be low.

BRIEF SUMMARY OF THE INVENTION

One aspect of the invention provides an electrochemical device comprising: a case including a power generation element therein; and a resin sealing assembly including an external terminal plate, a communication plate electrically connected to the power generation element, a PTC element placed between the external terminal plate and the communication plate, an electrode current collector electrically connected to the external terminal plate, and a sealing body made of resin, and sealing an opening of the case, wherein the relational expressions (1) to (3) are satisfied where the heat conductivity of the resin sealing body is $\lambda(W/m \cdot K)$ and the amount of heat generation in the PTC element at the time of tripping is Q (W):

$$0.12 \leq \lambda \leq 0.27; \tag{1}$$

$$1.0 \leq Q \leq 1.5; \text{and} \tag{2}$$

$$Q \leq -3.33\lambda + 1.9 \text{ are met.} \tag{3}$$

Here, the "heat conductivity µ" of the resin sealing body can be measured in the following manner. Specifically, the "heat conductivity λ" can be measured by a laser flash method in which a resin forming a resin sealing body is molded into a disc shape to prepare a test piece, laser light is applied to one surface of the obtained test piece, and the temperature response of the other surface is measured. For example, using LFA 427 manufactured by NETZSCH Co., Ltd., a test piece having a diameter of 10 mm and a thickness of 1 mm can be prepared to measure the heat conductivity λ. Although the above described "heat conductivity λ" is measured using a laser flash method, many other methods are available to measure the "heat conductivity λ". For instance, the "heat conductivity" can be measured using a hot-wire apparatus, electrical resistivity, thermal diffusivity, and comparing the sample to a known value, or any other method to measure heat conductivity.

The "amount of heat generation Q" when the PTC element trips can be measured in a manner described below. Specifically, a PTC element and an ampere meter are serially connected by a nickel lead wire having 5.0 mm width and 0.1 mm thickness to a battery (e.g. a size AA alkaline battery) having no PTC element incorporated therein to form a circuit. The voltage of the PTC element and the current of the circuit are measured 3 minutes and 5 minutes after the obtained circuit is closed, and the power of the PTC element is determined from a product of the obtained voltage value and current value. The amount of heat generation Q can be calculated from average value of the determined powers after 3 minutes and 5 minutes.

The power generation element in an aspect of the invention refers to a positive electrode mixture, a gelled negative electrode and an alkaline electrolyte. Therefore, the aforementioned communication plate may be electrically connected to any of the positive electrode mixture, the gelled negative electrode and the alkaline electrolyte.

According to the configuration described above, the PTC element is mounted in the case so as to be covered with a resin sealing body having a low heat conductivity, and therefore transmission of heat generated in the PTC element to the case at the time of a short circuit can be impeded, thus making it possible to prevent an increase in surface temperature of the body portion of the electrochemical device.

According to an aspect of the invention, a highly reliable battery of which the surface temperature of a body portion of a battery at the time of a short circuit is controlled to be low can be realized.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

One embodiment of the invention will be described with reference to FIGS. 1 and 2. Although, the invention will be described using a primary cylindrical battery such as size AA (LR6) battery, it should be appreciated by one skilled in the art that the invention may be incorporated into any type of electrochemical device. For example, the invention may be incorporated into primary type batteries which may include Dry Batteries (e.g., Manganese Battery, Alkaline Battery, OXY-RIDE Dry Battery), Lithium Batteries, and Thermal Batteries. The invention may also be included secondary type batteries such as Lithium Ion Rechargeable Batteries, Ni-MH Batteries, Ni—Cd Batteries, and Electric Vehicle Batteries. In addition, the invention may be incorporated into capacitors such as Aluminum Electrolytic Capacitors and Electrochemical Double Layer Capacitors. The invention may also be incorporated into other battery shapes in addition to cylindrical batteries such as prismatic type batteries, coin type batteries, button type batteries, and laminate type batteries.

Figure 1:
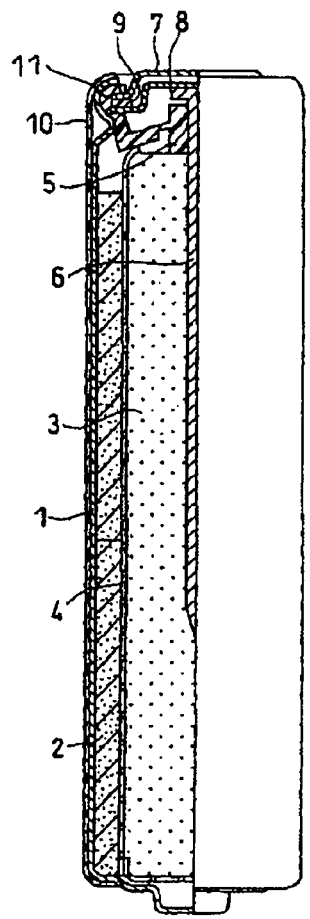
FIG. 1 is a front view showing, in the form of a section, a part of one embodiment of a cylindrical battery (size AA battery) of the invention.

FIG. 1 is a front view showing, in the form of a section, a part of one embodiment of a cylindrical battery (size AA battery (LR6)) of the invention.

As shown in FIG. 1, a bottomed cylindrical battery case 1 also serving as an external terminal contains a plurality of hollow cylindrical positive electrode mixtures (pellets) 2 in an inscribed manner. A gelled negative electrode 3 is placed via a bottomed cylindrical separator 4 in a hollow portion of the positive electrode mixture 2. The positive electrode mixture 2, the separator 4 and the gelled negative electrode 3 contain an alkaline electrolyte.

The battery case 1 is obtained by, for example, press-molding a nickel-plated steel plate into a predetermined dimension and shape.

For the separator 4, for example, a nonwoven fabric prepared by mixing mainly polyvinyl alcohol fibers and rayon fibers is used.

For the positive electrode mixture 2, for example, a mixture of a positive electrode active material containing a manganese dioxide powder, a conductive agent such as a graphite powder and an alkaline electrolyte such as an aqueous potassium hydroxide solution is used.

For the gelled negative electrode 3, for example, a mixture of a negative electrode active material such as a zinc powder or a zinc alloy powder, a gelling agent such as sodium polyacrylate and an alkaline electrolyte such as an aqueous potassium hydroxide solution is used.

In this connection, for the negative electrode active material, a zinc alloy powder excellent in corrosion resistance is preferably used, and further, in an environmentally friendly manner, it is preferable that silver, cadmium or lead is not added or none of these elements is added. The aforementioned zinc alloy is, for example, a zinc alloy containing indium, aluminum and bismuth.

An opening of the battery case 1 is sealed by a sealing assembly 11 after power generation elements such as the positive electrode mixture 2 and the gelled negative electrode 3 are contained. The sealing assembly 11 is comprised of an external terminal plate 7, a communication plate 8 electrically connected to an electrode current collector 6, a PTC element 9 and a resin sealing body 5. Electrode current collector 6 may be a positive electrode current collector or a negative electrode current collector. The outer surface of the battery case is covered with an exterior label 10.

Figure 2:
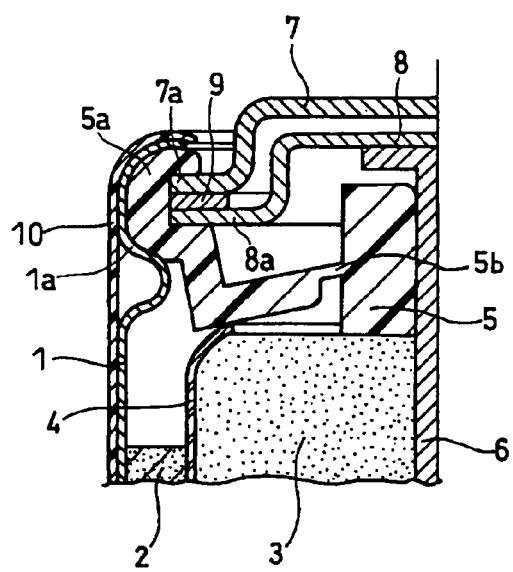
FIG. 2 is a longitudinal sectional view of an enlarged essential part of a sealing portion of the cylindrical primary battery shown in FIG. 1.

FIG. 2 is a sectional view of an enlarged essential part of a sealing portion of the cylindrical primary battery shown in FIG. 1. The resin sealing body 5 has at the center a through-hole into which the electrode current collector 6 is inserted under pressure, and has on its periphery an annular thin-walled portion 5b acting as a safety valve, and in the outer peripheral portion of the annular thin-walled portion 5b, a cylindrical outer peripheral edge portion 5a is formed so as to seamlessly contact the annular thin-walled portion 5b.

For example, the resin sealing body 5 is obtained by injection-molding polypropylene, nylon or the like into a predetermined dimension and shape.

The external terminal plate 7 has a flange portion 7a on a peripheral edge portion, and the communication plate 8 has a flange portion 8a in a peripheral edge portion. For the external terminal plate 7, for example, a nickel-plated steel plate is used. For the communication plate 8, a tin-plated steel plate or a nickel-plated steel plate is preferably used because of the low contact resistance.

The ring-shaped PTC element 9 is placed between the flange portion 7a of the external terminal plate 7 and flange portion 8a of the communication plate 8. On a step portion 1a provided in the vicinity of the opening of the battery case 1, an opening end portion of the battery case 1 is bent so as to envelop the upper end of the outer peripheral edge portion 5a of the resin sealing body 5, and the bent portion is caulked inward to squeeze the flange portion 7a of the external terminal plate 7, the ring-shaped PTC element 9 having an opening and the flange portion 8a of the communication plate 8 so as to be covered with the outer peripheral edge portion 5a of the resin sealing body 5.

For the PTC element 9, for example, a material which is sold under the name of Polyswitch manufactured by Tyco Electronics Co., Ltd. is used. The PTC element 9 has a (trip) function of abruptly increasing the resistance when reaching a predetermined temperature (e.g. approximately 90 to approximately 110° C.), and the PTC element itself vigorously generates heat by an overcurrent at the time of a short circuit of the battery. PTC elements 9 having the same resistance value per unit area generate different amounts of heat if there is a difference in the outer or inner diameter of a ring into which the PTC element 9 is processed by, for example, press punching or the like when forming the sealing assembly 11. Namely, the amount of heat generation increases as the area of the ring increases.

Here, a feature of the invention consists in meeting the relational expressions of:

$$0.12 \leq \lambda \leq 0.27; \tag{1}$$

$$1.0 \leq Q \leq 1.5; \text{ and} \tag{2}$$

$$Q \leq -3.33\lambda + 1.9, \tag{3}$$

where the heat conductivity of the resin sealing body 5 is λ (W/m·K) and the amount of heat generation in the PTC element 9 at the time of tripping is Q(W).

An increase in surface temperature of the cylindrical primary battery (especially side surface portion) can more reliably be inhibited by meeting the relational expressions (1) to (3) described above. Further, the heat conductivity λ of the resin sealing body 5 is $0.12 \leq \lambda \leq 0.19$ and the amount of heat generation Q in the PTC element 9 at the time of tripping is $1.0 \leq Q \leq 1.25$, since those conditions allow the surface temperature of the cylindrical primary battery to be low more effectively.

The resin sealing body 5 may be formed with polypropylene. If so doing, the heat resistance to heat generation in the PTC element 9 is improved. The resin sealing body 5 may also be formed with 6,6 nylon or 6,12 nylon having a heat conductivity λ of $0.23 \leq \lambda \leq 0.27$ W/m·K, and in this case, the alkali resistance can be improved.

Exemplary embodiments of the invention have been described above, but the invention is not limited thereto. For example, the PTC element may have a variety of shapes, and is not limited to a continuous ring shape, but may have, for example, a discontinuous ring shape partly having gaps. For example, discontinuous island portions may also be included.

EXAMPLES

The invention will be described more in detail below using examples, but the invention is not limited to the examples shown below. In this connection, in the examples below, cylindrical primary batteries having a structure shown in FIGS. 1 and 2 were prepared.

Example 1

(1) Preparation of Positive Electrode Mixture

Manganese dioxide and graphite were mixed at a weight ratio of 90:10. The mixture thus obtained and a 35 wt % aqueous potassium hydroxide solution as an alkaline electrolyte were mixed at a weight ratio of 100:3, and the resultant mixture was sufficiently stirred, and then compression-molded into a flaky form to obtain a flaky positive electrode mixture. The flaky positive electrode mixture was then ground into a granular form, the powder thus obtained was classified by a screen, and a powder of 10 to 100 meshes was press-molded into a hollow cylindrical form to obtain a pellet-type positive electrode mixture 2.

(2) Preparation of Gelled Negative Electrode

Sodium polyacrylate as a gelling agent, a 35 wt % aqueous potassium hydroxide solution as an alkaline electrolyte and a negative electrode active material were mixed at a ratio of 1:33:66 to obtain a gelled negative electrode 3. In this connection, for the negative electrode active material, a zinc alloy powder containing 0.025 wt % of indium, 0.015 wt % of bismuth and 0.004 wt % of aluminum was used.

(3) Preparation of Sealing Assembly

A mixture (containing 0.2 wt % of talc) of polypropylene (BC4ASW manufactured by Japan Polypropylene Corporation, the same applies hereinbelow) and a talc (P3 manufactured by Nippon Talc Co., Ltd., the same applies hereinbelow) was sufficiently kneaded, and a resin sealing body 5 having a predetermined dimension and a ring shape and a test piece for measurement of a heat conductivity λ were then prepared by injection molding. The aforementioned polypropylene was molded into a disc form to prepare a test piece having a diameter of 10 mm and a thickness of 1 mm, and the heat conductivity λ was measured using LFA 427 manufactured by NETZSCH Co., Ltd. As a result, the heat conductivity λ of the resin sealing body 5 was 0.12 W/m·K.

A PTC element 9 was obtained by punching a material having a thickness of 0.3 mm, a specific resistance value of 0.03Ω at 20° C. and a specific resistance value of 10000Ω at a high temperature of 120° C. into a ring shape (having an outer diameter of 12.3 mm and an inner diameter of 9.7 mm) by a press. The amount of heat generation Q in the PTC element 9 at the time of tripping was 1.00 W. In certain embodiments of the present invention, the PTC element has a volume of 13 mm$^3$ to 21 mm$^3$ and in certain embodiments the PTC element has an area of 45 mm$^2$ to 71 mm$^2$ when viewed in plan view.

An external terminal plate 7 and a communication plate 8 were obtained by processing a nickel-plated steel plate having a thickness of 0.3 mm by a press so as to have a predetermined dimension and shape.

Next, an electrode current collector 6 obtained by press-processing a brass wire into a peg shape and plating tin on its surface was electrically welded to the communication plate 8, and then inserted into a through-hole at the center of a resin sealing body 5 in close contact with the body (so that the electrode current collector 6 is fixed by the resin sealing body 5), and on a flange portion 8a of the communication plate 8, the PTC element 9 was placed and further, the external terminal plate 7 was placed so as to sandwich the PTC element 9 to obtain a sealing assembly 11.

(4) Assembly of Cylindrical Primary Battery

A size AA alkaline battery (LR6) having a structure shown in FIG. 1 was prepared according to the following procedure. Two positive electrode mixtures 2 obtained in a manner described above were inserted into a battery case 1, and the positive electrode mixtures 2 were pressed by a pressing tool and thereby brought into close contact with the inner wall of the battery case 1. A bottomed cylindrical separator 4 was placed at the center of the positive electrode mixtures brought into close contact with the inner wall of the battery case 1. A predetermined amount of aqueous solution containing 36 wt % of potassium hydroxide was injected into the separator 4. After a lapse of predetermined time, a gelled negative electrode 3 obtained in a manner described above was filled in the separator 4.

In this connection, a nonwoven fabric including mainly polyvinyl alcohol fibers and rayon fibers was used for the separator 4. An opening of the battery case 1 was sealed by squeezing with an opening end portion of the battery case 1 via a sealing assembly 11. The outer surface of the battery case 1 was covered with an exterior label 10 to prepare a cylindrical primary battery.

Example 2

In this example, a PTC element 9 was obtained by punching the material into a ring shape having an outer diameter of 12.3 mm and an inner diameter of 8.7 mm. The amount of heat generation Q in the PTC element 9 at the time of tripping was 1.26 W. A cylindrical primary battery was prepared in the same manner as in example 1 except for the PTC element 9.

Example 3

In this example, a PTC element 9 was obtained by punching the material into a ring shape having an outer diameter of 12.3 mm and an inner diameter of 7.8 mm. The amount of heat generation Q in the PTC element 9 at the time of tripping was 1.50 W. A cylindrical primary battery was prepared in the same manner as in example 1 except for the PTC element 9.

Example 4

In this example, to polypropylene was added a talc in an amount of 5 wt %, the resultant mixture was sufficiently kneaded, and a resin sealing body 5 having a predetermined dimension and shape and a test piece for measurement of a heat conductivity were then prepared by injection molding. From the result of measurement of the heat conductivity of this test piece, the heat conductivity λ of the resin sealing body 5 was 0.19 W/m·K. A cylindrical primary battery was prepared in the same manner as in example 1 except for the resin sealing body 5.

Example 5

In this example, a PTC element 9 was obtained by punching the material into a ring shape having an outer diameter of 12.3 mm and an inner diameter of 8.7 mm. The amount of heat generation Q in the PTC element 9 at the time of tripping was 1.26 W. A cylindrical primary battery was prepared in the same manner as in example 4 except for the PTC element 9.

Example 6

In this example, to polypropylene was added to talc in an amount of 10 wt %, the resultant mixture was sufficiently kneaded, and a resin sealing body 5 having a predetermined dimension and shape and a test piece for measurement of a heat conductivity were then prepared by injection molding. From the result of measurement of the heat conductivity of this test piece, the heat conductivity λ of the resin sealing body 5 was 0.27 W/m·K. A cylindrical primary battery was prepared in the same manner as in example 1 except for the resin sealing body 5.

Example 7

In this example, to nylon 6,6 (Leona 1300S manufactured by Asahi Kasei Corporation, the same applies hereinbelow) was added to talc in an amount of 0.5 wt %, the resultant mixture was sufficiently kneaded, and a resin sealing body 5 having a predetermined dimension and shape and a test piece for measurement of a heat conductivity were then prepared by injection molding. From the result of measurement of the heat conductivity of this test piece, the heat conductivity λ of the resin sealing body 5 was 0.25 W/m·K. A cylindrical primary battery was prepared in the same manner as in example 1 except for the resin sealing body 5.

Example 8

In this example, to nylon 6,6 was added to talc in an amount of 1 wt %, the resultant mixture was sufficiently kneaded, and a resin sealing body 5 having a predetermined dimension and shape and a test piece for measurement of a heat conductivity were then prepared by injection molding. From the result of measurement of the heat conductivity of this test piece, the heat conductivity λ of the resin sealing body 5 was 0.27 W/m·K. A cylindrical primary battery was prepared in the same manner as in example 1 except for the resin sealing body 5.

Example 9

In this example, to nylon 6,12 (Zytel (trade name) manufactured by Dupont USA Co., Ltd.) was added to talc in an amount of 0.5 wt %, the resultant mixture was sufficiently kneaded, and a resin sealing body 5 having a predetermined dimension and shape and a test piece for measurement of a heat conductivity were then prepared by injection molding. From the result of measurement of the heat conductivity of this test piece, the heat conductivity λ of the resin sealing body 5 was 0.23 W/m·K. A cylindrical primary battery was prepared in the same manner as in example 1 except for the resin sealing body 5.

Comparative Example 1

In this comparative example, a PTC element 9 was obtained by punching the material into a ring shape having an outer diameter of 12.3 mm and an inner diameter of 9.9 mm. The amount of heat generation Q in the PTC element 9 at the time of tripping was 0.89 W. A cylindrical primary battery was prepared in the same manner as in example 1 except for the PTC element 9.

Comparative Example 2

In this comparative example, a resin sealing body 5 having a predetermined dimension and shape and a test piece for measurement of heat conductivity were prepared by injection molding using polypropylene. From the result of measurement of the heat conductivity of this test piece, the heat conductivity λ of the resin sealing body 5 was 0.11 W/m·K. A cylindrical primary battery was prepared in the same manner as in example 1 except for the resin sealing body 5.

Comparative Example 3

In this comparative example, a PTC element 9 was obtained by punching the material into a ring shape having an outer diameter of 12.3 mm and an inner diameter of 7.4 mm. The amount of heat generation Q in the PTC element 9 at the time of tripping was 1.59 W. A cylindrical primary battery was prepared in the same manner as in example 1 except for the PTC element 9.

Comparative Example 4

In this comparative example, a PTC element 9 was obtained by punching the material into a ring shape having an outer diameter of 12.3 mm and an inner diameter of 7.8 mm. The amount of heat generation Q in the PTC element 9 at the time of tripping was 1.50 W. A cylindrical primary battery was prepared in the same manner as in example 4 except for the PTC element 9.

Comparative Example 5

In this comparative example, a PTC element 9 was obtained by punching the material into a ring shape having an outer diameter of 12.3 mm and an inner diameter of 8.7 mm. The amount of heat generation Q in the PTC element 9 at the time of tripping was 1.26 W. A cylindrical primary battery was prepared in the same manner as in example 9 except for the PTC element 9.

Comparative Example 6

In this comparative example, to nylon 6,6 was added a talc in an amount of 5 wt %, the resultant mixture was sufficiently kneaded, and a resin sealing body 5 having a predetermined dimension and shape and a test piece for measurement of a heat conductivity were then prepared by injection molding. From the result of measurement of the heat conductivity of this test piece, the heat conductivity λ of the resin sealing body 5 was 0.29 W/m·K. A cylindrical primary battery was prepared in the same manner as in example 1 except for the resin sealing body 5.

Evaluation Test (1) Five of the batteries obtained in each of the examples described above were externally short-circuited by connecting the battery case 1 to the external terminal plate 7 via a nickel lead wire having a thickness of 0.1 mm at an ambient temperature of 20° C. The surface temperature of a body portion of the battery was measured by a thermocouple to check a maximum temperature. The surface temperature of the body portion of the battery is preferably 70° C. or less, further preferably 65° C. or less.

(2) Further, two hours after the battery was externally short-circuited, whether or not a liquid leaked from between the battery case 1 and the sealing assembly 11 was visually checked.

(3) For four of the batteries of each example, a stroboscope was continuously made to emit light at a rate of one time per 10 seconds using Stroboscope Speed Lighter 580 EX manufactured by Canon Inc., and whether the PTC element 9 was unintentionally actuated so that the stroboscope could no longer emit light at the 20th time or before was checked.

The results of the evaluations described above are shown in Table 1.

TABLE 1

| | Resin sealing body | | PTC element | | | Calculated value $-3.33\lambda + 1.9$ | Maximum surface temperature at the time of a short circuit (° C.) | Stroboscope light emission test | Liquid leakage (number) |
|---|---|---|---|---|---|---|---|---|---|
| | Base resin | Heat conductivity λ(W/m · K) | Outer diameter (mm) | Inner diameter (mm) | Amount of heat generation Q (W) | | | | |
| Ex. 1 | Polypropylene having 0.2% of talc | 0.12 | φ 12.3 | φ 9.7 | 1.00 | 1.50 | 60 | Normal | 0 |
| Ex. 2 | Polypropylene having 0.2% of talc | 0.12 | φ 12.3 | φ 8.7 | 1.26 | 1.50 | 63 | Normal | 0 |
| Ex. 3 | Polypropylene having 0.2% of talc | 0.12 | φ 12.3 | φ 7.8 | 1.50 | 1.50 | 67 | Normal | 0 |
| Ex. 4 | Polypropylene having 5% of talc | 0.19 | φ 12.3 | φ 9.7 | 1.00 | 1.27 | 62 | Normal | 0 |
| Ex. 5 | Polypropylene having 5% of talc | 0.19 | φ 12.3 | φ 8.7 | 1.26 | 1.27 | 64 | Normal | 0 |
| Ex. 6 | Polypropylene having 10% of talc | 0.27 | φ 12.3 | φ 9.7 | 1.00 | 1.00 | 69 | Normal | 0 |
| Ex. 7 | Nylon 6,6 having 0.5% of talc | 0.25 | φ 12.3 | φ 9.7 | 1.00 | 1.07 | 66 | Normal | 0 |
| Ex. 8 | Nylon 6,6 having 1% of talc | 0.27 | φ 12.3 | φ 9.7 | 1.00 | 1.00 | 68 | Normal | 0 |
| Ex. 9 | Nylon 6,12 having 0.5% of talc | 0.23 | φ 12.3 | φ 9.7 | 1.00 | 1.13 | 68 | Normal | 0 |
| Comp. Ex. 1 | Polypropylene having 0.2% of talc | 0.12 | φ 12.3 | φ 9.9 | 0.89 | 1.50 | 61 | Light could be no longer emitted at the 17th time | 0 |
| Comp. Ex. 2 | Polypropylene | 0.11 | φ 12.3 | φ 9.7 | 1.00 | 1.53 | 59 | Light could be no longer emitted at the 14th time | 1 |
| Comp. Ex. 3 | Polypropylene having 0.2% of talc | 0.12 | φ 12.3 | φ 7.4 | 1.59 | 1.50 | 75 | Normal | 3 |
| Comp. Ex. 4 | Polypropylene having 5% of talc | 0.19 | φ 12.3 | φ 7.8 | 1.50 | 1.27 | 82 | Normal | 1 |
| Comp. Ex. 5 | Nylon 6,12 having 0.5% of talc | 0.23 | φ 12.3 | φ 8.7 | 1.26 | 1.13 | 85 | Normal | 1 |
| Comp. Ex. 6 | Nylon 6,6 having 5% of talc | 0.29 | φ 12.3 | φ 9.7 | 1.00 | 0.93 | 93 | Normal | 0 |

In examples 1-9 of the present invention, the heat conductivity λ of the resin sealing body 5 and the amount of heat generation Q of the PTC element 9 were well balanced, and the surface temperatures of the body portion of the batteries at the time of a short circuit at an ambient temperature of 20° C. were all controlled to be 70° C. or less. In addition, the PTC elements 9 were not unintentionally actuated during the stroboscope light emission test, and no liquid leakage occurred during short circuiting of the batteries.

In comparative example 2, the stroboscope no longer emitted light at the 14th time during the stroboscope light emission test, and liquid leakage occurred after the battery was short-circuited. In comparative example 6, the surface temperature of the body portion of the battery at the time of a short circuit was 93° C., which was extremely high. Namely, when the heat conductivity λ of the resin sealing body 5 is less than 0.12 W/m·K, it is hard to transmit heat, the PTC element 9 is unintentionally actuated due to heat generation in the PTC element 9 itself, and the outer peripheral edge portion 5a of the resin sealing body 5 is thermally damaged to be deformed or carbonized, causing liquid leakage or the like. When the heat conductivity λ exceeds 0.27 W/m·K, the heat generated in the PTC element 9 is easily transmitted to the battery case 1, and thus the surface temperature of the body portion of the battery cannot be controlled to be low.

In comparative example 1, the stroboscope could no longer emit light at the 17th time during the stroboscope light emission test. In comparative example 3, liquid leakage occurred after the battery was short-circuited. Namely, when the amount of heat generation Q in the PTC element 9 at the time of tripping is less than 1.0 W, the PTC element 9 tends to be unintentionally actuated with a small amount of heat generation, and when the amount of heat generation Q in the PTC element 9 at the time of tripping exceeds 1.5 W, the outer peripheral edge portion 5a of the resin sealing body 5 is thermally damaged to be deformed or carbonized, causing occurrence of liquid leakage.

In comparative examples 3 to 5, the amount of heat generation Q in the PTC element 9 was large relative to the heat conductivity λ of the resin sealing body 5, the surface temperature of the body portion of the battery at the time of a short circuit could not be sufficiently controlled, and the outer peripheral edge portion 5a of the resin sealing body 5 was deformed or carbonized due to the heat generation, leading to liquid leakage.

Figure 3:
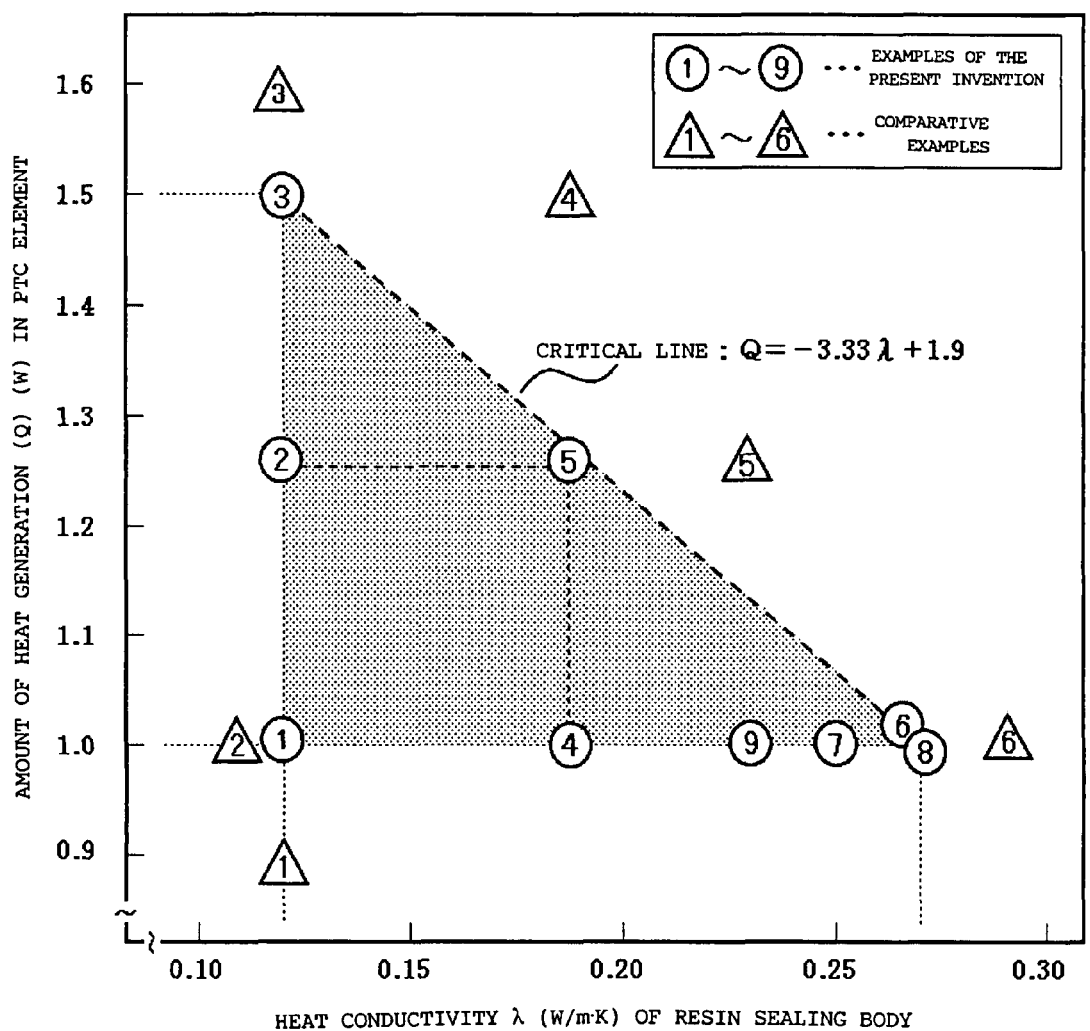
FIG. 3 is an explanatory view (graph) showing examples of the invention and comparative examples on a coordinate (of the heat conductivity λ of the resin sealing body versus the amount of heat generation Q in the PTC element at the time of tripping).

FIG. 3 is an explanatory view showing the above-described examples 1 to 9 of the invention and comparative examples 1 to 6 on a coordinate graph in which the abscissa represents the heat conductivity λ of the resin sealing body 5 and the ordinate represents the amount of heat generation Q in the PTC element 9 at the time of tripping. As shown in FIG. 3, it was found as a result of experiments conducted by the inventors that a resin sealing body 5 having a low heat conductivity is preferably used when a PTC element 9 emitting a large amount of heat, the heat conductivity λ of the resin sealing body 5 and the amount of heat generation Q in the PTC element 9 at the time of tripping have a negative correlation, and a critical line in which the surface temperature of the body portion of the battery can be sufficiently controlled to be low at the time of a short circuit is a straight line expressed by the equation of $Q = -3.33\lambda + 1.9$. Namely, the relational expression of $Q \leq -3.33\lambda + 1.9$ is preferably met within the range of the heat conductivity λ of the resin sealing body 5 and the amount of heat generation Q in the PTC element 9 at the time of tripping.

Further, in examples 1, 2, 4 and 5 of the invention in which the heat conductivity λ of the resin sealing body 5 is 0.12 W/m·K $\leq \lambda \leq$ 0.19 W/m·K and the amount of heat generation Q in the PTC element 9 is 1.0 W $\leq Q \leq$ 1.25 W, the surface temperature of the body portion of the battery at the time of a short circuit was controlled to be 65° C. or less.

In this connection, in the examples described above, the case where resin sealing bodies 5 composed of polypropylene, nylon 6,6 and nylon 6,12 were used has been described, but of course, the present invention can also be applied when a resin sealing body 5 composed of polyolefin resin other than polypropylene (e.g. polyethylene, polystyrene or the like) or polyamide resin other than nylon 6,6 and nylon 6,12 is used.

Furthermore, because the effect of the invention is not affected by a difference in power generation elements, the present invention is applicable not only to the cylindrical primary batteries of the zinc-manganese dioxide systems of the examples described above but also to various kinds of cylindrical primary batteries of zinc-nickel systems, lithium-iron disulfide systems, lithium-manganese systems, lithium-graphite fluoride and the like, and same effects can be obtained. The invention may also be applicable to: primary type batteries which may include Dry Batteries (e.g., Manganese Battery, Alkaline Battery, OXYRIDE Dry Battery), Lithium Batteries, and Thermal Batteries; secondary type batteries such as Lithium Ion Rechargeable Batteries, Ni-MH Batteries, Ni—Cd Batteries, and Electric Vehicle Batteries; and capacitors such as Aluminum Electrolytic Capacitors and Electrochemical Double Layer Capacitors.

The electrochemical device according to an aspect of the invention has high reliability and is suitably used in a power supply of an electronic device or a portable device or the like without anxiety.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An electrochemical device comprising:
a case;
a power generation element included in said case; and
a resin sealing assembly including an external terminal plate, a communication plate electrically connected to said power generation element, a positive temperature coefficient (PTC) element placed between said external terminal plate and said communication plate, an electrode current collector electrically connected to said external terminal plate, and a sealing body made of resin, and sealing an opening of said case;
wherein said resin sealing body comprises polypropylene; and
wherein relational expressions (1) to (3) are satisfied where the heat conductivity of said resin sealing body is λ (W/m·K) and an amount of heat generation in said PTC element at a time of tripping is Q (W):

$$0.12 \leq \lambda \leq 0.27; \tag{1}$$

$$1.0 \leq Q \leq 1.5; \text{ and} \tag{2}$$

$$Q \leq -3.33\lambda + 1.9. \tag{3}$$

2. The electrochemical device in accordance with claim 1, wherein $0.12 \leq \lambda \leq 0.19$ and $1.0 \leq Q \leq 1.25$.

3. A cylindrical primary battery comprising:
a bottomed cylindrical battery case;
a power generation element included in said battery case; and
a resin sealing assembly including an external terminal plate, a communication plate electrically connected to said power generation element, a positive temperature coefficient (PTC) element placed between said external terminal plate and said communication plate, a collector electrically connected to said external terminal plate, and a sealing body made of resin, and sealing an opening of said battery case;
wherein said resin sealing body comprises polypropylene; and
wherein relational expressions (1) to (3) are satisfied where the heat conductivity of said resin sealing body is $\lambda$ (W/m·K) and an amount of heat generation in said PTC element at a time of tripping is Q (W):

$$0.12 \leq \lambda \leq 0.27; \tag{1}$$

$$1.0 \leq Q \leq 1.5; \text{ and} \tag{2}$$

$$Q \leq -3.33\lambda + 1.9. \tag{3}$$

4. The cylindrical primary battery in accordance with claim 3, wherein $0.12 \leq \lambda \leq 0.19$ and $1.0 \leq Q \leq 1.25$.

5. A cylindrical primary AA-size battery comprising:
a bottomed cylindrical battery case;
a power generation element included in said battery case; and
a resin sealing assembly including an external terminal plate, a communication plate electrically connected to said power generation element, a PTC positive temperature coefficient element placed between said external terminal plate and said communication plate, a electrode current collector electrically connected to said external terminal plate, and a sealing body made of resin, and sealing an opening of said battery case;
wherein said resin sealing body comprises of polypropylene; and
wherein relational expressions (1) to (3) are satisfied where the heat conductivity of said resin sealing body is $\lambda$ (W/m·K) and an amount of heat generation in said PTC element at a time of tripping is Q (W):

$$0.12 \leq \lambda \leq 0.27; \tag{1}$$

$$1.0 \leq Q \leq 1.5; \text{ and} \tag{2}$$

$$Q \leq -3.33\lambda + 1.9. \tag{3}$$

6. The cylindrical primary AA-size battery in accordance with claim 5, wherein said PTC element is ring-shaped.

7. The cylindrical primary AA-size battery in accordance with claim 6, wherein said PTC element has an area of 45 mm² to 71 mm² when viewed in plan view.

8. The cylindrical primary AA-size battery in accordance with claim 5, wherein $0.12 \leq \lambda \leq 0.19$ and $1.0 \leq Q \leq 1.25$.

* * * * *